Patented Oct. 25, 1938

2,134,531

UNITED STATES PATENT OFFICE

2,134,531

PURIFICATION OF MALEIC ANHYDRIDE

Elton B. Punnett, Buffalo, N. Y., assignor to National Aniline & Chemical Company, Inc., New York, N. Y., a corporation of New York No Drawing. Application September 4, 1934, Serial No. 742,583

12 Claims. (Cl. 260—343)

This invention relates to the purification of maleic anhydride. It relates especially to the purification of a crude or partially purified maleic anhydride resulting from the catalytic partial oxidation in the vapor phase of organic substances (so-called "catalytic maleic anhydride").

Processes are well known to the art for the catalytic air oxidation of organic substances in the vapor phase resulting in the production of maleic anhydride. Thus, it is well known that maleic anhydride can be produced by the vapor phase catalytic oxidation of benzene, toluene, xylene, naphthalene and other organic substances in contact with a catalytic oxide maintained at an elevated temperature in the presence of a gas containing free oxygen, e. g., atmospheric air.

As generally practiced in the art, the reaction products are recovered as the acid or as the anhydride. When recovered in the form of the acid the reaction mixture is condensed and/or absorbed in water to form an aqueous solution. For the production of maleic anhydride, the maleic acid recovered from the aqueous solution is heated with a dehydrating agent, such as acetyl chloride or phosphorus pentoxide. This procedure results in the production of an impure maleic anhydride in relatively low yields, probably owing to the transformation of some of the maleic acid to fumaric acid as well as to its decomposition to other products. Furthermore, the reaction mixtures resulting from the catalytic oxidation of organic substances in the vapor phase for the production of maleic anhydride generally contain other substances in various amounts in addition to the maleic anhydride, many of which condense or are absorbed along with the maleic anhydride, thereby contaminating the maleic acid. Thus, maleic anhydride is produced as a main product of the vapor-phase catalytic partial oxidation of benzene vapors, or as a by-product in the catalytic air oxidation of naphthalene vapors to phthalic anhydride, and it may be recovered by absorbing in water the reaction product, when benzene is employed, or the residual gases or effluent vapors remaining after removal of phthalic anhydride, when naphthalene is employed. As a result there is produced an impure solution of maleic acid containing phthalic acid and/or quinones, and other impurities, and when the maleic acid is converted to maleic anhydride the resulting maleic anhydride contains many of the impurities present in the crude maleic acid. In the direct recovery of maleic anhydride in the form of the anhydride from the gaseous reaction mixtures resulting from catalytic oxidation of organic compounds in the vapor phase, an advantageous procedure involves absorbing the maleic anhydride from the gaseous reaction mixture in a non-aqueous liquid which is a solvent for maleic anhydride, and then recovering the maleic anhydride by crystallization from the solvent or by distillation. The maleic anhydride thus obtained is generally also contaminated by impurities, the maleic anhydride frequently being highly colored yellow to greenish yellow to orange. In many cases purification of the resulting maleic anhydride by repeated distillation fails to remove the color, although it may remove a part of the color and otherwise increase the purity of the maleic anhydride.

The principal object of the present invention is to provide a simple and efficient method for the purification and/or decolorization of maleic anhydride and especially maleic anhydride resulting from the vapor phase catalytic oxidation of organic compounds.

According to the present invention impure maleic anhydride, and particularly impure catalytic maleic anhydride, obtained as such or as maleic acid (followed by conversion to the anhydride), and especially that obtained by the vapor phase catalytic oxidation of benzene, is purified by subjecting it to the action of sulfuric acid or other sulfuric acidifying agent (as for example, sulfur trioxide, oleum, sodium hydrogen sulfate, etc.) whereby the impurities, particularly colored impurities, are destroyed and/or rendered nonvolatile, and recovering a purified maleic anhydride by vaporizing the treated maleic anhydride, removing and condensing the vapor and collecting the condensate. The process is preferably carried out by heating the impure maleic anhydride with the sulfuric acidifying agent (for example, concentrated sulfuric acid), preferably at the boiling temperature under the pressure conditions employed, distilling off maleic anhydride, and collecting a distillate of purified maleic anhydride.

The purification of maleic anhydride in accordance with the present invention may be applied to impure or colored maleic anhydride, and especially impure or colored caltaytic maleic anhydride, in various forms (e. g., in the solid form or in the form of solutions in solvents) as well as to that produced in various ways (e. g., by crystallization from its solutions, by distillation or sublimation of crude maleic anhydride, or by dehydration of maleic acid).

The amount of sulfuric acid or other sulfuric acidifying agent employed in the practice of the present invention may vary. For practical purposes an amount at least sufficient to effect the purification or removal of the color of the maleic anhydride is employed. The minimum amount required will vary with the different qualities of maleic anhydride treated; the particular amount required in any case may be determined by treatment of a sample. In general, an amount of concentrated sulfuric acid (e. g. sulfuric acid monohydrate) ranging from about 0.5 to about 5.0 per cent by weight of the maleic anhydride to be purified, will effect a satisfactory purification of a crude maleic anhydride resulting from the vapor phase catalytic oxidation of benzene with air. Preferably the amount of sulfuric acid, or other sulfuric acidifying agent employed, should not be considerably in excess of that required to effect the purification, as otherwise the yields of purified maleic anhydride may be decreased. In some instances it may be necessary, in order to obtain the desired degree of purification, to re-treat the product several times with the sulfuric acidifying agent, with or without an intermediate distillation.

Distillation of the maleic anhydride, when carried out in connection with the purification process of the present invention, may be at atmospheric pressure or at sub-atmospheric pressure. Sub-atmospheric pressure is preferably employed in order to permit distillation at a lower temperature and thereby reduce decomposition.

The purification procedure of the present invention may be combined with the direct recovery of maleic anhydride from the gaseous reaction mixtures resulting from the catalytic air oxidation of benzene or other suitable organic compounds. For purposes of illustration, the invention will be further described in connection with such recovery procedure. It will be evident from the foregoing, however, that the process is not limited thereto and may be employed for the purification of maleic anhydride resulting from the partial oxidation or decomposition of vapors of other organic materials in the presence of a catalyst, and particularly maleic anhydride recovered in the anhydride form as a reaction product of the vapor phase catalytic air oxidation of an organic compound.

A mixture of benzene vapors and air is passed through an enclosed space (such as a so-called converter tube) containing a contact mass or catalyst under conditions suitable for the production of maleic anhydride whereby there is produced a reaction mixture containing maleic anhydride, water vapor, nitrogen, CO, $CO_2$ and other products of combustion. The maleic anhydride is recovered from the reaction mixture by condensing it while avoiding substantial condensation of water vapor, i. e., while maintaining the conditions such that water vapor is retained in the gas mixture. The condensation of the maleic anhydride is preferably effected by absorbing it in a water-immiscible substance which is liquid under the conditions of the treatment, while maintaining a temperature adapted to prevent substantial condensation of water. When the absorbent is saturated with maleic anhydride it is cooled or otherwise treated to crystallize out maleic anhydride, and the crystals are separated from the mother liquor in any suitable manner as for example, by filtration or centrifugation. The resulting crystals may be partially purified by recrystallization from a solvent or they may be washed with a volatile solvent to remove adhering mother liquor. The crude or partially purified crystals may then be heated in a suitable vessel with about 0.5 to about 5.0 per cent of their weight of concentrated sulfuric acid, preferably to the boiling point of maleic anhydride and with or without the presence of a stream (current) of air, the vapors given off during the heating operation being subjected to rectification and then drawn off and condensed. The condensate obtained at first, if colored, is separately collected and, as it contains some maleic anhydride, it may be added to the next batch to be treated. The purified maleic anhydride is then obtained as a condensate upon further vaporization and condensation and is separately collected. Sublimation or distillation may be employed in the vaporization; but distillation is preferred since it gives a higher yield of recovered product and furthermore the product is purer.

The absorbent may be any suitable water-immiscible substance which is liquid under the conditions of the treatment. It is preferably an organic compound which is relatively inert with respect to the reaction mixture and in which maleic anhydride is soluble. The liquid may have a relatively high vapor pressure or a relatively low vapor pressure; and liquids which boil at a relatively low temperature, for example, below 100° C. may be used as well as those which boil at higher temperatures. When a liquid is employed which has a relatively low boiling point and/or a relatively high vapor pressure, the absorption may be carried out under superatmospheric pressure so as to minimize the loss of the absorbent carried out as vapor by the effluent gases, particularly at elevated absorption temperatures, as well as to increase the efficiency of the absorption. The absorption may be carried out at atmospheric pressure, however, if desired.

Among the absorbents which are useful in the process there may be mentioned, by way of example, liquid hydrocarbons of the aliphatic and aromatic series, ethers, aromatic nitro-compounds, halogenated hydrocarbons of the aliphatic and aromatic series, halogenated hydrogenated aromatic hydrocarbons, etc., and mixtures thereof; as for example, benzene, toluene, solvent naphtha, petroleum ether, gasolene, motor oil, heavy solvent, diphenyl, nitrobenzene, nitrotoluene, mixtures of nitrotoluenes, diethyl ether, diphenyloxide, chloroform, carbon tetrachloride, chlorobenzenes, chloronaphthalenes, etc.

The temperature at which the absorption is carried out will vary with the liquid employed as absorbent, with the pressure under which the absorption is carried out, with the solubility of maleic anhydride in the liquid employed and with the dew-point of the maleic anhydride in the gas mixture treated. A temperature is generally employed which is below the dew-point of the maleic anhydride in the gas mixture, so that, in effect a condensation thereof will take place in the solvent. Preferably a temperature is employed which is considerably (for example 15° to 50° C.) below the dew-point; which does not result in an uneconomical loss of solvent in the gas stream passing from the absorber, and at which the solubility of the product in the solvent is relatively great.

The vaporization of the crude maleic anhydride may be effected in any suitable manner and in any suitable apparatus. It is preferably distilled, that is boiled, in a still equipped with a fractionating or rectifying column, a condenser, and receivers. The distillation may be carried out at atmospheric or subatmospheric pressure. It is preferably carried out under a high vacuum, for example about 28 or more inches of mercury (an absolute pressure of about 2 or less inches of mercury) inasmuch as less decomposition and an increased yield are thereby obtained.

The purification also may be effected without a preliminary crystallization of the absorbed maleic anhydride from the solvent, particularly when the difference between the boiling points of maleic anhydride and of the water-immiscible organic liquid is sufficiently great. Thus, a solution resulting from the absorption of catalytic maleic anhydride in a water-immiscible organic solvent having a boiling point at atmospheric pressure of about 100° to about 160° C. may be fractionally distilled so as to first remove a vapor fraction containing said organic liquid, together with volatile impurities and a small amount of maleic anhydride, and then may be treated with sulfuric or other sulfuric acidifying agent in the manner herein described.

As illustrative embodiments of a manner in which the invention may be practiced, the following examples are presented. The invention is not limited thereto, however, and various changes may be made in the materials employed and in the method and details of procedure without departing from the scope of the invention as defined in the appended patent claims. The parts are by weight:

Example 1

Part A: A mixture containing vapors of commercial benzene and about 30 times their weight of air is passed in contact with a catalyst for the formation of maleic anhydride in the known manner, and the resulting gas mixture containing maleic anhydride is cooled to about 110° to 150° C., and then brought into contact with solvent naphtha held at a temperature of 45° to 70° C. and a superatmospheric pressure of 15 to 20 lbs. per square inch, whereby a solution of maleic anhydride in the solvent naphtha is obtained.

Part B: The resulting solution of maleic anhydride in solvent naphtha is introduced into a jacketed iron still which is connected with a fractionating column and a vacuum pump. Steam at a temperature of about 150° C. is supplied to the jacket of the still and a vacuum of 25 inches of mercury is applied to the system, whereby distillation is produced at an absolute pressure of about 5 inches of mercury. Distillation is continued with removal and condensation of vapors until substantially all of the solvent naphtha has been removed.

Part C: When substantially all of the solvent naphtha has been removed by distillation, the distillation is interrupted and sulfuric acid monohydrate (100% $H_2SO_4$) is added to, and mixed with, the molten material which remains in the still, the weight of sulfuric acid being about 1 to 5 per cent of the weight of said material. The resulting mixture is then subjected to further distillation under a gage vacuum of about 28 inches of mercury. The vapors are rectified in the fractionating column and the rectified vapors are condensed and collected in a suitable receiver until a sample of the condensate withdrawn from the condenser has a setting point of about 52° C. The receiver is then changed and distillation is continued with rectification and collection of the condensate until substantially all of the maleic anhydride has been distilled.

The middle fraction of the distillate, the main product of the distillation, may be collected for example, in trays or drums, allowed to cool, and broken up into pieces of suitable size, or it may be permitted to cool while being subjected to a flaking process and thereby recovered in the form of flakes. It constitutes a maleic anhydride which is of high purity (about 99.4 per cent), which in the solid form is white, or nearly so, in color, which melts into a liquid that is clear and substantially colorless, which has a setting point of about 52° to 52.5° C. or higher, and which forms a clear solution with equal parts of warm water. The first portion of condensate contains impure maleic anhydride, and it may be added to the next batch of product distilled in order to recover its maleic anhydride content. The small amount of residue which remains in the still may be removed in any suitable manner, as by washing it out with hot water or a hot dilute aqueous solution of alkali.

After the addition of the sulfuric acid, if desired the mixture may be heated, preferably with refluxing at the boiling temperature, to bring about the action of the sulfuric acid on the impurities, and then distilled or otherwise treated to recover the maleic anhydride in purified form.

The fractionating column aids in preventing the discoloration of the distillate. Without its use, some impurities are apparently entrained and a colored product is apt to result.

Example 2

Part A: A gaseous reaction mixture containing maleic anhydride and resulting from the vapor phase catalytic oxidation of benzene or other suitable organic substance, such as the cooled reacted mixture treated in Example 1, is bubbled through an absorption vessel which contains baffles, bubbler plates, or similar devices for assuring an intimate contact between the gas and liquid, and which is partly filled with alpha-chlornaphthalene maintained by suitable cooling means at a temperature of about 45° C. to about 60° C., preferably about 45° C. When the alpha-chlornaphthalene becomes saturated with maleic anhydride, it is withdrawn from the absorber and cooled, preferably to a temperature of about 3° C. A mass of small, fine, needle-like crystals is separated from the mother liquor, as, for example, by filtration or whizzing, and the crystals are washed with solvent naphtha until free from alpha-chlornaphthalene.

Part B: 100 parts of the crystallized and washed maleic anhydride thus obtained are charged into an oil jacketed iron still equipped with a fractionating column, a condenser and receivers, and 1 to 2 parts of sulfuric acid monohydrate are added. The still is heated to produce distillation, the vapors are subjected to rectification in the fractionating column, and the rectified vapors are withdrawn through the condenser to form a first fraction of condensate. The distillation is continued until the boiling point of the distillate is about 190° C. at atmospheric pressure and the distillate has a setting point of 51.3° C. The receiver is then changed, and distillation is continued with rectification and collection of the condensate until the boiling point of the distillate is about 202° C. at atmospheric pressure. The resulting condensate has a setting-point between 51.5° and 52.5° C.

Example 3

Part A: A solution of maleic anhydride in solvent naphtha is prepared in accordance with Example 1, Part A.

Part B: The maleic anhydride is separated from the solvent naphtha by cooling the solution, preferably to about 3° C., to produce crystallization of the maleic anhydride, and the crystals are separated from the mother liquor by filtration, centrifuging, or in any other suitable manner. The crystallized maleic anhydride, containing residual mother liquor adhering thereto, is heated with sulfuric acid as described in Example 1, Part C, or Example 2, Part B (with distillation at atmospheric or subatmospheric pressure).

In the claims, it will be understood that the term "catalytic maleic anhydride" refers to and is limited to a maleic anhydride which has been prepared by the partial or selective oxidation of an organic compound, such as benzene, in the vapor phase mixed with oxygen or an oxygen-containing gas in contact with a suitable catalyst; and that the term "maleogenetic substance" refers to and is limited to a substance which results in maleic anhydride when subjected to selective or partial oxidation in the vapor phase in admixture with oxygen or an oxygen-containing gas in contact with a suitable catalyst.

I claim:

1. A method of purifying maleic anhydride resulting from the vapor phase catalytic oxidation of a maleogenetic substance and containing a small proportion of impurities which comprises treating such impure maleic anhydride with an acidifying agent of the sulfuric anhydride class selected from the group consisting of concentrated sulfuric acid, oleum, sulfur trioxide, and sodium hydrogen sulfate, and vaporizing the treated maleic anhydride.

2. A method of purifying maleic anhydride resulting from the vapor phase catalytic oxidation of a maleogenetic substance and containing a small proportion of impurities, which comprises subjecting such impure maleic anhydride to the action of an acidifying agent of the sulfuric anhydride class selected from the group consisting of concentrated sulfuric acid, oleum, sulfur trioxide and sodium hydrogen sulfate.

3. A method of purifying maleic anhydride resulting from the vapor phase catalytic oxidation of a maleo-genetic substance and containing a small proportion of impurities which comprises heating such impure maleic anhydride with concentrated sulfuric acid, distilling the heated maleic anhydride, and condensing and collecting a distillate of purified maleic anhydride.

4. A method of purifying maleic anhydride resulting from the vapor phase catalytic oxidation of a maleo-genetic substance and containing a small proportion of impurities which comprises vaporizing such impure maleic anhydride in the presence of a sulfuric anhydride substance selected from the group consisting of cencentrated sulfuric acid, oleum, sulfur trioxide and sodium hydrogen sulfate, condensing the vapors, and collecting a condensate of purified maleic anhydride.

5. A method of purifying maleic anhydride resulting from the vapor phase catalytic oxidation of a maleo-genetic substance and containing a small proportion of impurities which comprises distilling such impure maleic anhydride in the presence of concentrated sulfuric acid.

6. A method of purifying maleic anhydride resulting from the vapor phase catalytic oxidation of a maleo-genetic substance and containing a small proportion of impurities which comprises distilling such impure maleic anhydride in the presence of a small amount of concentrated sulfuric acid, condensing the distillate, and separately collecting a condensate of purified maleic anhydride.

7. A method of purifying maleic anhydride resulting from the vapor phase catalytic oxidation of a maleo-genetic substance and containing a small proportion of impurities which comprises heating such impure maleic anhydride with a small amount of concentrated sulfuric acid, then distilling the heated maleic anhydride, and condensing and collecting a distillate of purified maleic anhydride.

8. A method of purifying maleic anhydride resulting from the vapor phase catalytic oxidation of a maleo-genetic substance and containing a small proportion of colored impurities which comprises mixing the maleic anhydride with about 0.5 to about 5.0 per cent of its weight of concentrated sulfuric acid, and distilling the resulting mixture.

9. A method of purifying maleic anhydride resulting from the catalytic air oxidation of benzene in the vapor phase and containing a small proportion of colored impurities, which comprises mixing the maleic anhydride with about 1 to 5 per cent of its weight of concentrated sulfuric acid, distilling and rectifying the resulting mixture at subatmospheric pressure, and condensing and collecting a condensate of purified maleic anhydride.

10. A method of purifying maleic anhydride resulting from the catalytic air oxidation of benzene in the vapor phase and containing a small proportion of colored impurities, which comprises mixing the maleic anhydride with about 1 to 5 per cent of its weight of sulfuric acid monohydrate, distilling and rectifying the resulting mixture under high vacuum conditions, and separately condensing and collecting a condensate of purified maleic anhydride.

11. A method of purifying maleic anhydride resulting from the vapor phase catalytic oxidation of benzene and containing a small proportion of colored impurities which comprises heating the maleic anhydride with concentrated sulfuric acid, distilling the resulting maleic anhydride, and separately collecting a condensate of purified maleic anhydride.

12. The method of purifying maleic anhydride resulting from the vapor phase catalytic oxidation of an aromatic compound and containing a small proportion of impurities which comprises mixing the maleic anhydride with concentrated sulfuric acid, distilling and rectifying the resulting mixture at subatmospheric pressure, and condensing and collecting a condensate of purified maleic anhydride.

ELTON B. PUNNETT.